United States Patent
Yamamoto et al.

(10) Patent No.: US 6,653,423 B1
(45) Date of Patent: Nov. 25, 2003

(54) RANDOM COPOLYMERS, PROCESS FOR THE PRODUCTION THEREOF AND MEDICAL MATERIAL

(75) Inventors: Nobuyuki Yamamoto, Tsukuba (JP); Hiroki Fukui, Tsukuba (JP); Ken Suzuki, Tsukuba (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 10/031,431
(22) PCT Filed: Jul. 13, 2000
(86) PCT No.: PCT/JP00/04691
§ 371 (c)(1), (2), (4) Date: Jan. 14, 2002
(87) PCT Pub. No.: WO01/05855
PCT Pub. Date: Jan. 25, 2001

(30) Foreign Application Priority Data

Jul. 14, 1999 (JP) .......................................... 11-200360

(51) Int. Cl.$^7$ ............................................. C08F 130/02
(52) U.S. Cl. .................... 526/277; 526/218.1; 526/310; 526/312
(58) Field of Search .............................. 526/218.1, 277, 526/310, 312

(56) References Cited

FOREIGN PATENT DOCUMENTS

| GB | 2179666 A | * | 3/1987 | |
|---|---|---|---|---|
| JP | 62-15214 | | 1/1987 | ......... C08F/230/02 |
| JP | 7-184989 | | 7/1995 | ........... A61L/33/00 |
| JP | 07184990 A | | 7/1995 | |

* cited by examiner

*Primary Examiner*—Helen L. Pezzuto
(74) *Attorney, Agent, or Firm*—Darby & Darby

(57) ABSTRACT

A random copolymer obtained by polymerizing a monomer composition comprising allylamine or a salt thereof and a monomer bearing a phosphorylcholine-like group, comprising 0.01 to 9 mole % of constituent units (A1) derived from allylamine or a salt thereof and 91 to 99.99 mole % of constituent units (A2) derived from a monomer bearing a phosphorylcholine-like group, and having a number-average molecular weight of 50000 to 5000000. This copolymer is excellent in biocompatibility, can be easily fixed on the surfaces of substrates, and exhibit good surface lubricity when formed into films, thus being useful as medical material.

8 Claims, 2 Drawing Sheets

RANDOM COPOLYMERS, PROCESS FOR THE PRODUCTION THEREOF AND MEDICAL MATERIAL

FIELD OF THE INVENTION

The present invention relates to a novel random copolymer, a production method thereof and a medical material. In particular, the present invention relates to a random copolymer that includes both amino groups and phosphorylcholine-like groups and shows biocompatibility as well as excellent physical properties such as wear-resistance. The present invention further relates to production methods of such random copolymers, and medical materials using such copolymers.

BACKGROUND ART

Polymers made of 2-methacryloyloxyethylphosphorylcholine (abbreviated hereinafter as MPC, while the polymers are abbreviated as MPC polymers) show high biocompatibility since they have chemical structure similar to phospholipids found in living systems. Technologies have been developed for making use of such MPC polymers in medical high molecular material and in cosmetic materials.

MPC copolymers obtained through copolymerization of MPC and a monomer having a hydrophobic group have hitherto been used as biocompatible materials. A substrate having a surface coated with such a copolymer can be used as, e.g., a medical instrument with little problem as long as exposure of the substrate to blood is for a brief period of time. However, long term exposure to blood may result in gradual dissolution of the applied copolymer into blood or falling of the copolymer off the surface of the substrate. This leads to a problem that the blood compatibility of the medical instrument does not last long.

To avoid these problems, a coating agent has been proposed, for example, in Japanese Patent Publication No. JP-A-7-502053, which contains copolymers obtained through polymerization of a monomer composition containing a reactive comonomer, such as an amino group-containing (meth)acrylate or an amino group-containing styrene monomer, and a monomer having a phosphorylcholine-like group (which may be abbreviated hereinafter as a PC group, while the monomer may be abbreviated hereinafter as PC monomer). The purpose of the reactive comonomer is to allow the coating agent to bind to the surface of the substrate through covalent bonds.

However, amino group-containing (meth)acrylates or amino group-containing styrene monomers are generally expensive and are disadvantageous for industrial use.

In methods disclosed in Japanese Patent Publication No. JP-A-7-184989 and in Japanese Patent Publication No. JP-A-7-184990, an MPC copolymer having epoxy groups and another MPC copolymer having hydroxyl, amino, or carboxyl groups are used to promote the binding of the coating to the surface of substrate such as a medical instrument through chemical bonds.

A copolymer having the number average molecular weight of 45000 is disclosed as an example of the amino acid-containing MPC copolymer. A method for producing this copolymer is also disclosed, wherein 6 g (20 mmol) of MPC, 4.95 g (35 mmol) of butyl methacrylate (abbreviated hereinafter as BMA), 0.18 g (3.2 mmol) of allylamine (which may be abbreviated hereinafter as AAM), and 0.04 g of 2,2'-azobisisobutyronitrile (abbreviated hereinafter as AIBN) are dissolved in 28 ml of ethanol and the reaction mixture is placed in a hot bath at 60° C. for 24 hours to carry out polymerization.

However, with this method, it is difficult to obtain high-molecular weight copolymers with number average molecular weight of, for example, 50000 or higher. In addition, the resulting copolymer has limited proportion of amino group content. Therefore, it is difficult to fix these amino group-containing MPC copolymers to the surface of substrate. This may result in a weak coating. Also, smoothness of the surface of the resulting coating may be lost due to the small molecular weights.

A monomer composition containing AAM as a comonomer such as the above-described monomer composition can hardly undergo radical polymerization, generally resulting in polymers with low degrees of polymerization in low yields. In prior art methods, the polymers with high molecular weights cannot be obtained even if other vinyl monomers that can readily undergo polymerization have been copolymerized with AAM. One reason for this seems to be that an auto-termination reaction occurs when allyl hydrogen atoms react with radicals. The reaction is commonly called as an allyl-type destructive chain transfer and described in many journals and textbooks (see, e.g., C. E. Schildnecht, "Allyl Compounds and Their Polymers", Wiley Interscience, p19–30 (1973), R. C. Laible, Chemi. Rev., 58(5), p807–843 (1958), and Takayuki Otsu "Kaitei Koubunshi Gousei no Kagaku (Chemistry of Macromolecule Synthesis, Revised edition)" Kagaku-Dojin Publishing Company, Inc., p92–95 (1968 first ed.)).

In comparison, radical homopolymerization of AAM salts can produce high molecular weight products with high yields by making use of an azo-polymerization initiator and employing an aqueous polymerization system (S. Harada, S. Hasegawa, Macromol. Chem., Rapid Commun., 5, 27–31 (1984)).

Blood compatibility of charged polymers has long been studied from various aspects. For example, materials having excess positive charge on their surfaces are known to exhibit poor blood compatibility (Akaike et al., Japanese Journal of Polymer Science and Technology, 36, p.217 (1979)). Thus, it is desired that the amount of positively charged monomers be kept small in order to improve blood compatibility. Further, the PC copolymers containing reactive groups lose their smoothness if they contain large amounts of the reactive groups since binding reaction to substrate occurs at many locations and the amount of water contained in the resulting PC copolymer layer is reduced. This makes the polymer improper to be used as the material which are required to have smoothness such as a catheter.

DISCLOSURE OF THE INVENTION

It is an objective of the present invention to provide a random copolymer that has an excellent biocompatibility, can readily be bound to a surface of substrate, can exhibit an excellent surface smoothness when applied as a coating, and is thus suitable for use as a material for various surface treating agents, additives, and medical instruments.

It is another objective of the present invention to provide a material for medical use that has an excellent biocompatibility, can readily be bound to the surface of substrate, and can exhibit an excellent surface smoothness when applied as a coating.

That is, according to the present invention, there is provided a random copolymer which is obtained by polymerization of a monomer composition containing allylamine or a salt thereof and a monomer having a phosphorylcholine-like group, wherein the copolymer includes a constituent unit (A1) derived from allylamine or the salt thereof in an amount of 0.01 to 9 mol % and a constituent unit (A2) derived from the monomer having the phosphorylcholine-like group in an amount of 91 to 99.99 mol %, and wherein the copolymer has a number average molecular weight of 50000 to 5000000.

According to the present invention, there is also provided a random copolymer including a constituent unit (a1) derived from allylamine or a salt thereof and represented by formula (1):

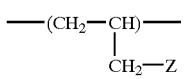

(1)

wherein Z is —NH$_2$ or a salt thereof; and
a constituent unit (a2) derived from a monomer having a phosphorylcholine-like group and represented by formula (2):

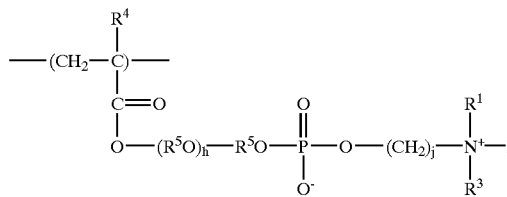

(2)

wherein R$^1$, R$^2$ and R$^3$ may or may not be identical to one another and each represents a hydrocarbon group having 1 to 4 carbon atoms, R$^4$ represents a hydrogen atom or a methyl group, R$^5$ represents a divalent hydrocarbon group having 1 to 10 carbon atoms, h is an integer from 0 to 10, and j is an integer from 2 to 4;
wherein the random copolymer contains the constituent unit (a1) derived from allylamine and the salt thereof in an amount of 0.01 to 9 mol % and the constituent unit (a2) derived from the monomer having the phosphorylcholine-like group in an amount of 91 to 99.99 mol %, and wherein the copolymer has a number average molecular weight of 50000 to 5000000.

According to the present invention, there is further provided a method for producing the random copolymer. The method is characterized by allowing a monomer composition containing allylamine or a salt thereof and a monomer having a phosphorylcholine-like group to undergo radical polymerization at a temperature of 5 to 80° C. in an aqueous solvent containing 50 wt % or more of water with the help of at least one polymerization initiator selected from azo-polymerization initiators and radical polymerization organic peroxides.

According to the present invention, there is still further provided a medical material containing the above-described random copolymer.

PREFERRED EMBODIMENTS OF THE INVENTION

Figure 1:
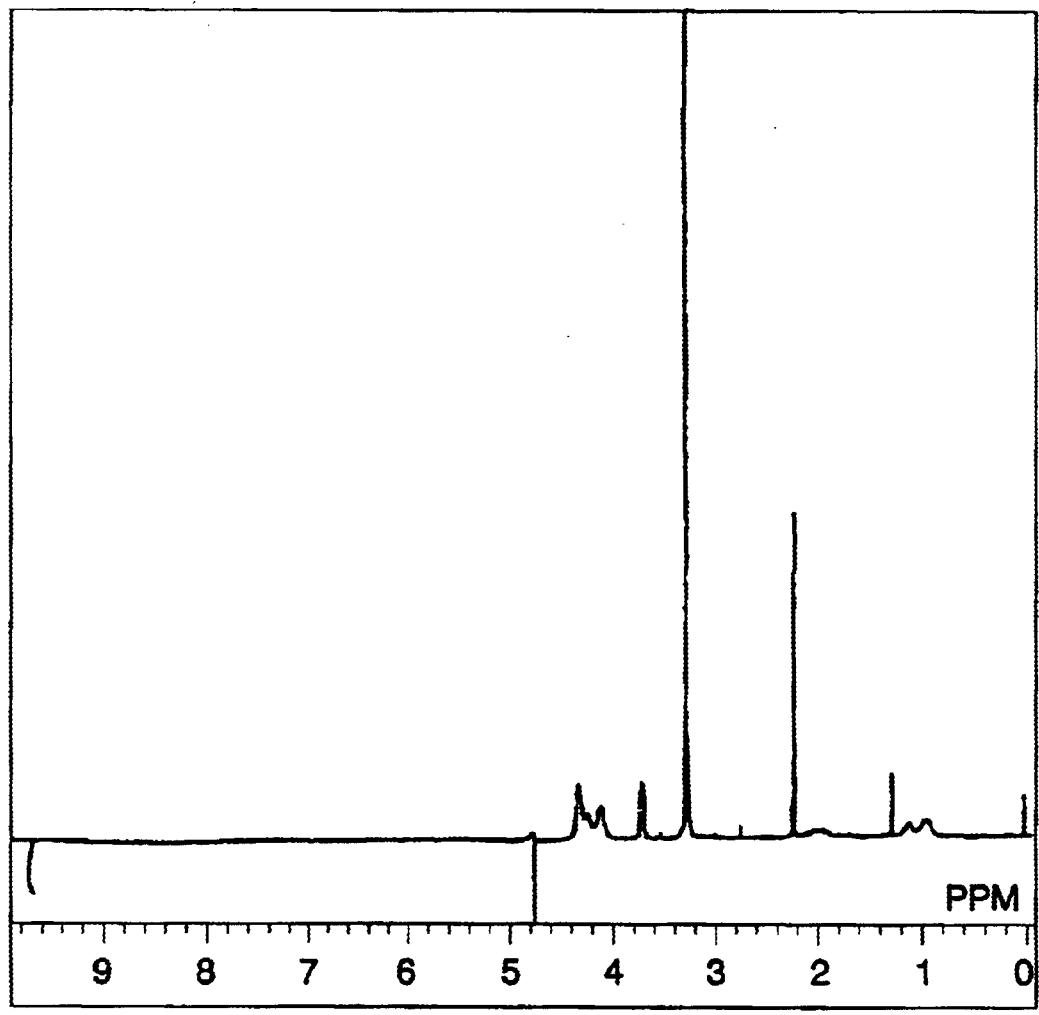
FIG. 1 is a measurement chart of $^1$H-NMR of Example 1.

The random copolymer of the present invention is a specific copolymer that is obtained through polymerization of a monomer composition containing AAM or a salt thereof and a PC monomer.

AAM used in the present invention may include free AAM or AAM salts. Examples of the AAM salts may include allylamine hydrochloride (abbreviated hereinafter as AAM.HCl), allylamine sulfate, allylamine nitrite, and allylamine phosphate. Of these, AAM.HCl is preferred because of its availability.

Examples of the PC monomers of the present invention may include 2-(meth)acryloyloxyethyl-2'-(trimethylammonio)ethyl phosphate (including MPC), 3-(meth)acryloyloxypropyl-2'-(trimethylammonio)ethyl phosphate, 4-(meth)acryloyloxybutyl-2'-(trimethylammonio)ethyl phosphate, 5-(meth)acryloyloxypentyl-2'-(trimethylammonio)ethyl phosphate, 6-(meth)acryloyloxyhexyl-2'-(trimethylammonio)ethyl phosphate, 2-(meth)acryloyloxyethyl-2'-(triethylammonio)ethyl phosphate, 2-(meth)acryloyloxyethyl-2'-(tripropylammonio)ethyl phosphate, 2-(meth)acryloyloxyethyl-2'-(tributylammonio)ethyl phosphate, 2-(meth)acryloyloxypropyl-2'-(trimethylammonio)ethyl phosphate, 2-(meth)acryloyloxybutyl-2'-(trimethylammonio)ethyl phosphate, 2-(meth)acryloyloxypentyl-2'-(trimethylammonio)ethyl phosphate, 2-(meth)acryloyloxyhexyl-2'-(trimethylammonio)ethyl phosphate, 2-(meth)acryloyloxyethyl-3'-(trimethylammonio)propyl phosphate, 3-(meth)acryloyloxypropyl-3'-(trimethylammonio)propyl phosphate, 4-(meth)acryloyloxybutyl-3'-(trimethylammonio)propyl phosphate, 5-(meth)acryloyloxypentyl-3'-(trimethylammonio)propyl phosphate, 6-(meth)acryloyloxyhexyl-3'-(trimethylammonio)propyl phosphate, 2-(meth)acryloyloxyethyl-4'-(trimethylammonio)butyl phosphate, 3-(meth)acryloyloxypropyl-4'-(trimethylammonio)butyl phosphate, 4-(meth)acryloyloxybutyl-4'-(trimethylammonio)butyl phosphate, 5-(meth)acryloyloxypentyl-4'-(trimethylammonio)butyl phosphate, and 6-(meth)acryloyloxyhexyl-4'-(trimethylammonio)butyl phosphate. The term (meth)acryl as used herein refers to acryl and/or methacryl. These monomers may be used independently or in combination of two or more monomers. Use of MPC is particularly preferred because of its availability.

The amount of constituent unit (A1) derived from AAM or the salt thereof is from 0.01 to 9 mol %, preferably from 0.1 to 5 mol %, in the copolymer of the present invention. The amount of constituent unit (A2) derived from the PC monomer is from 91 to 99.99 mol %, preferably from 95 to 99.9 mol %. If the amount of the constituent unit (A1) is less than 0.01 mol %, it is difficult to have the copolymer coating bind to the substrate in a desired manner when, for example, the copolymer coating is to be applied to substrate having epoxy groups, since the number of the reactive functional groups present in the copolymer is not sufficiently large.

The amount of the constituent unit (A1) and the constituent unit (A2) is from 91.01 to 100 mol %, preferably from 95.1 to 100 mol %, in the copolymer. Thus, in addition to the constituent unit (A1) and the constituent unit (A2), the copolymer of the present invention may include other constituent unit in an amount of 0 to 8.99 mol %, preferably 0 to 4.9 mol %. The other constituent unit may suitably be selected from those which do not adversely affect the desired effect of the present invention or those which enhance desired effects, provided that they are constituent units derived from copolymerizable monomers.

Preferably, the constituent unit (A1) is a constituent unit (a1) represented by formula (1) above. In formula (1), Z may be —NH₂ or a salt thereof. Preferably, the constituent unit (A2) is a constituent unit (a2) represented by formula (2) above. In formula (2), $R^1$, $R^2$ and $R^3$ may or may not be identical to one another and each represents a hydrocarbon group having 1 to 4 carbon atoms such as a methyl, ethyl, propyl and butyl group. $R^4$ represents a hydrogen atom or a methyl group. $R^5$ represents a divalent hydrocarbon group having 1 to 10 carbon atoms such as a methylene, ethylene, propylene, butylene, and pentyl group. The subscript h is an integer from 0 to 10 while the subscript j is an integer from 2 to 4.

In the copolymer of the present invention, the polymer including the constituent units derived from AAM or the salt thereof and the constituent units derived from the PC monomer may include other constituent units derived from other monomers in an amount from 0 to 8.99 mol %.

The copolymer of the present invention has a number average molecular weight of 50000 to 5000000, preferably 100000 to 1000000. If the number average molecular weight is less than 50000, physical properties such as wear-resistance of the surface coating layer may deteriorate when the copolymer of the present invention is applied to the substrate as a surface treating agent for forming the coating layer on the surface of the substrate. In contrast, it becomes difficult to produce the copolymer if the number average molecular weight exceeds 5000000.

The copolymer of the present invention includes at its terminals a group produced in the termination reaction of the radical polymerization. Examples of the terminal group may include terminal groups represented by formulae (3) to (5) derived from polymerization initiators and terminal group represented by formulae (6) and (7) derived from the AAM monomers. It may further include polymerization terminals derived from a chain transfer agent or a solvent.

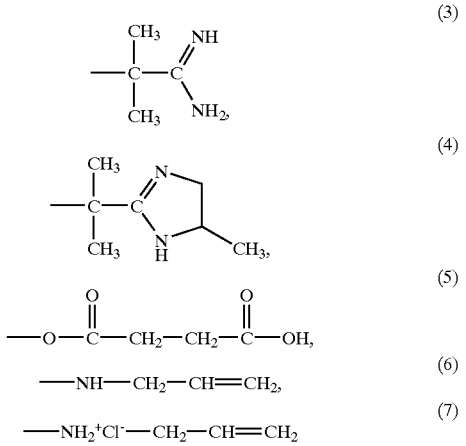

The copolymer of the present invention may preferably be produced by the following production methods of the present invention.

In the production method of the present invention, a monomer composition containing AAM or a salt thereof and a PC monomer is allowed to undergo radical polymerization using a specific polymerization initiator in a specific solvent at a specific temperature.

Preferably, AAM or the salt thereof and the PC monomer are those listed in the specific examples above. The amounts of these monomers are suitably selected so that the copolymer contains the above-described amounts of the constituent unit (A1) and the constituent unit (A2).

When necessary, the monomer composition may contain other monomers constituting the above-described other constituent units, provided that these other monomers do not adversely affect intended effects of the present invention. These other monomers may include any monomers that can be copolymerized such as (meth)acrylic acid and salts thereof; alkyl esters of (meth)acrylic acid such as methyl (meth)acrylate, ethyl (meth)acrylate, propyl (meth)acrylate, butyl (meth)acrylate, hexyl (meth)acrylate; hydroxyl group-containing esters of (meth)acrylic acid such as 2-hydroxyethyl (meth)acrylate, 2-hydroxypropyl (meth) acrylate, polyethylene glycol mono(meth)acrylate, polypropylene glycol mono(meth)acrylate, mono(meth) acrylates of block or random copolymers of polyethylene glycol-polyproplylene glycol, glycerol-α-mono(meth) acrylate, allyl alcohol, 2-allyl phenol, glycerol-α-monoallyl ether, ethylene glycol monoallyl ether and 4-(hydroxymethyl)acrylamide; and hydroxyl group-containing (meth)acrylic acid amides. These copolymerizable other monomers may be contained in the copolymer in suitable amounts such that the amount of the constituent unit derived from the other monomers is 8.99 mol % or less, particularly 5 mol % or less in the resulting copolymer.

The polymerization initiator used in the production method of the present invention is at least one of azo-polymerization initiators and radical polymerization organic peroxides.

Examples of the specific polymerization initiators for use in the present invention may include azo-radical polymerization initiators such as 2,2'-azobis(2-amidinopropane) dihydrochloride, 2,2'-azobis(2-(5-methyl-2-imidazoline-2-yl)propane)dihydrochloride, 4,4'-azobis(4-cyanovaleric acid), 2,2'-azobisisobutylamide dihydrate, 2,2'-azobis(2,4-dimethylvaleronitrile), AIBN, dimethyl-2,2'-azobisisobutylate, 1-((1-cyano-1-methylethyl)azo) formamide, 2,2'-azobis(2-methyl-N-phenyl propionamidine)dihydrochloride, 2,2'-azobis(2-methyl-N-(2-hydroxyethyl)propionamide), 2,2'-azobis(2-methylpropionamide)dihydrate, 4,4'-azobis(4-cyanopentanoic acid), and 2,2'-azobis(2-(hydroxymethyl) propionitrile); organic peroxides such as benzoyl peroxide, diisopropylperoxydicarbonate, t-butylperoxy-2-ethylhexanoate, t-butylperoxypivalate, t-butylperoxydiisobutylate, lauroyl peroxide, t-butyl peroxyneodecanoate, succinic acid peroxide (succinyl peroxide), glutarperoxide, succinyl peroxyglutarate, t-butyl peroxymaleate, t-butyl peroxypivalate, di-2-ethoxyethylperoxycarbonate, and 3-hydroxy-1,1-dimethylbutylperoxypivalate; and persulfates such as ammonium persulfate, potassium persulfate, and sodium persulfate. Of these, water-soluble azo-compounds such as 2,2'-azobis(2-amidinopropane)dihydrochloride and 2,2'-azobis(2-(5-methyl-2-imidazoline-2-yl)propane) dihydrochloride are particularly preferred. The polymerization initiators may be used independently or as mixtures thereof. The amount of the polymerization initiator used in the production method of the present invention is typically from 0.001 to 10 parts by weight, preferably from 0.01 to 5.0 parts by weight in proportion to 100 parts by weight of the monomer composition.

The solvent used in the production method of the present invention is an aqueous solvent containing 50 wt % or more of water. The solvent may include 100% water. The solvent may be any solvent that can dissolve the monomer composition and does not react with the monomers, provided that it contains 50 wt % or more of water. Examples of the solvents other than water that account for 50 wt % or less of the solvent include alcohol solvents such as methanol, ethanol, and isopropanol; ketone solvents such as acetone, methyl ethyl ketone, and diethyl ketone; ester solvents such as ethyl acetate; straight-chained or cyclic ether solvents such as ethyl cellosolve, and tetrahydrofuran; and nitrogen-containing solvents such as acetonitrile and nitromethane. Preferably, the solvent is 100% water or mixed solvents of water and alcohol.

The copolymer with a desired high molecular weight cannot be obtained if the amount of water is less than 50 wt % in the solvent.

In conducting polymerization in the production method of the present invention, known techniques, including solution polymerization, bulk polymerization, emulsion polymerization, and suspension polymerization, may be used to carry out radical polymerization. Gaseous components in polymerization system may be replaced with inert gases such as nitrogen, carbon dioxide, and helium, or the polymerization may be carried out under atmosphere of the inert gas. The polymerization must be carried out at a temperature of 5 to 80° C. Preferably, the polymerization is allowed to continue for a time period of 10 minutes to 48 hours.

The resulting copolymer may be purified using known purification techniques such as re-precipitation, dialysis, and ultrafiltration.

The medical material of the present invention contains the above-described random copolymer of the present invention. Embodiments of the medical material of the present invention may include a medical instrument having a surface to which the random copolymer of the present invention is fixed, and a medical instrument produced by mixing the random copolymer of the present invention with a material for the medical instrument and shaping the resultant mixture into the medical instrument.

In the medical instrument having a surface to which the random copolymer of the present invention is fixed, the random copolymer may be attached to the surface of the medical instrument through bonding such as covalent bond, ionic bond, and coordinate bond. Of these, covalent bond is preferred because of the durability of fixed copolymer.

The covalent bond may be produced by providing on the surface of the medical instrument with functional groups that are reactive with amino groups present in the present random copolymer and covalently bonding the reactive groups to the amino groups in the random copolymer.

Examples of the functional groups to be provided on the surface of the medical instrument include carboxyl group, carboxylic acid anhydride group, epoxy group, and isocyanate group. In cases where the medical instrument have on its surface only functional groups such as hydroxyl and amino groups that are non-reactive with amino groups, the surface of the medical instrument may be made reactive with amino groups by converting the functional groups using a multifunctional reagent such as diisocyanate and diepoxy reagents.

In cases where the medical instrument is made of those which does not have any functional groups such as polyethylene, the surface of the medical instrument may be subjected to treatments including plasma treatment, corona treatment, and ozone treatment to provide, for example, carboxyl groups to the surface, thereby making the surface reactive with amino groups.

When the medical instrument is made of polyesters that have carboxylic acid ester bonds such as polyethylene terephthalate and polyethylene naphthalate, the surface may be made reactive with amino groups by subjecting it to treatments such as alkali hydrolysis treatment and supercritical treatment to form carboxyl groups on the surface.

When a coating is previously applied to the surface of the medical instrument, the random copolymer of the present invention may be bound to the surface by taking advantage of functional groups present in the coating layer. For example, when the surface coating layer is formed from a maleic acid polymer, carboxyl groups in maleic acid and amino groups in the random copolymer of the present invention may undergo condensation reaction, forming covalent bonds. Similarly, when the surface coating layer is formed from vinyl polymers such as anhydrous maleic acid polymer, fumaric acid polymer, and (meth)acrylic acid polymer, polysaccharides such as alginic acid and hyaluronic acid, or proteins such as gelatin, covalent bonds may be formed with functional groups present in these materials.

When the medical instrument is made of a metal, it may be bound to the random copolymer of the present invention by means of a binder. For example, when the metal is cobalt, chrome, tin, or copper, 4-methacryloxyethyl trimellitic acid anhydride (abbreviated hereinafter as 4-META) polymer, which shows excellent adhesiveness to the metal, may be used as the binder to bind the random copolymer to the medical instrument. When the 4-META polymer is used as the binder, acid anhydride groups present in the 4-META polymer exhibit a high reactivity with amino groups present in the random copolymer of the present invention. Thus, by using this binder, the random copolymer of the present invention can be bound to the surface of the medical instrument through covalent bonds.

Upon producing the medical instrument, the random copolymer of the present invention may be mixed with the material of the medical instrument through different processes such as solvent casting, solution reaction, and kneading.

In the solvent casting process, a solvent, such as water, alcohol, or mixtures thereof, in which both the random copolymer of the present invention and the material of the medical instrument can be dissolved is used and the solvent is evaporated after the solutes have been dissolved. In this case, the material of the medical instrument may be polyethylene glycol or dextran.

In the solution reaction process, the material of the medical instrument may be any material which can be dissolved in a solvent such as water, alcohol, or mixtures thereof in which the random copolymer of the present invention can be dissolved, and has functional groups reactive with amino groups. A medical material as an insoluble cross-linked structure containing the random copolymer of the present invention can be obtained by allowing the above-described material of the medical instrument to react with the random copolymer of the present invention in the above-described solvent. Examples of the material that can be dissolved in the solvent in which the random copolymer of the present invention can dissolve and has functional groups reactive with amino groups include alginic acid, hyaluronic acid, and gelatin. Even if the material only has functional groups, such as hydroxyl groups or amino groups, that are non-reactive with amino groups, it may be converted to a material having functional groups reactive with amino groups by converting the functional groups using a multifunctional reagent such as diisocyanate and diepoxy reagent.

In the solution reaction process, a reaction accelerator such as a water-soluble condensation agent may be added if the reaction is carried out at an elevated or room temperature.

The kneading process may be performed by heat-melting an ordinary medical instrument material, such as polyolefin, polyurethane, or polyamide, kneading the material with the random copolymer of the present invention, and molding the mixture. The medical instrument material may be solely composed of the random copolymer of the present invention. To ensure that the random copolymer of the present invention firmly binds to the material in the kneading process, an additive may optionally be added that has functional groups such as isocyanate and carboxyl groups that are reactive with amino groups.

The medical material of the present invention, which includes the random copolymer of the present invention bound to a surface of or within the medical material, achieves biocompatibility and improved surface smoothness. Accordingly, the medical material of the present invention is suitable for use in, for example, various medical catheters, guide wires, suture threads, wound covering materials, artificial joints, intraocular lenses, and contact lenses.

EXAMPLES

While the present invention will now be described in further detail by means of Examples and Comparative Examples, the invention is not limited thereto.

The measurement methods in Examples are described in the following:

<Measurement of Number Average Molecular Weight>

The number average molecular weight of the resulting copolymer was measured by gel-permeation chromatography (GPC) using polyethylene glycol as a standard sample. An aqueous solution of the obtained copolymer was diluted with distilled water so that the amount of the copolymer was 0.5 wt %. The diluted solution was filtered by a 0.45 $\mu$m membrane filter to give a test solution, which is subjected to GPC analysis under the following conditions.

Conditions for GPC Analysis

Column: G3000PWXL×2 (manufactured by TOSOH Corporation), Eluent: 20 mM phosphate buffer, Standard material: polyethylene glycol (manufactured by POLYMER LABORATORIES Ltd.), Detection: differential refractometer, weight average molecular weight (Mw), number average molecular weight (Mn), Calculation of Molecular Weight Distribution (Mw/Mn): molecular weight-calculating program with integrator, manufactured by TOSOH Corporation. (GPC program for SC-8020), Flow rate: 0.5 ml/min, Amount of sample solution used: 10 $\mu$l, Column Temperature: 45° C.

<Measurement Methods of Composition Ratio of Polymers>

The composition ratio of the polymer was calculated from the results of the measurement of the amount of amino groups in the polymer. The amount of amino groups in the polymer was determined by a labeling reaction using trinitrobenzenesulfonic acid (referred to hereinafter as TNBS). Aqueous solutions having different AAM-HCl concentrations were prepared and a calibration curve was established to verify the linearity. An aqueous solution of AAM-HCl (50 ppm) was prepared as a standard solution, and an aqueous solution of the polymer containing 1% (w/w) of the polymer was prepared as a sample solution. As reaction solutions, a borate buffer (3.81 g of borax dissolved in 100 ml of warm water), an aqueous solution of TNBS (0.10%), and an aqueous solution of sodium sulfite (0.13%) were prepared. The labeling reaction was performed in the following manner.

First, 0.5 ml of the sample solution were placed in a test tube, followed by addition of 2.0 ml of the boric acid buffer, then 0.5 ml of the sodium sulfite solution, and then 0.5 ml of the TNBS solution. The mixture was incubated in a thermostatic chamber at 37° C. for 60 minutes.

Measurement was done on an ultraviolet-visible absorbance analyzer, U-best 35, manufactured by JASCO corporation. A disposable Cell made of PMMA having an ptical path length of 10 mm, was used as a spectroscopy cell and absorbance at the wavelength of 420 nm was determined. Using AAM-HCl as a standard monomer component, the linearity of absorbance at 420 nm was verified. The AAM-HCl component of the copolymer was quantified in the following manner using 50 ppm AAM-HCl as a standard sample and the composition ratio was calculated.

Given that s is the absorbance of 50 ppm AAM-HCl at 420 nm, t is the absorbance of 1 wt % solution of the copolymer at 420 nm, and x is the amount of amino groups (in terms of AAM-HCl) in 1 wt % (=10000 ppm) of the copolymer, then x=50 t/s. If the amount of AAM-HCl unit in 1 mol of the copolymer is $\alpha$ mols, then the amount of MPC unit is given by (1−$\alpha$) mols. If the molecular weight of AAM-HCl is given by $M_A$ and the molecular weight of MPC by $M_M$, then it is true that $\alpha M_A/((1-\alpha)M_M+\alpha M_A)=x/10000$, since the amount of amino groups in the copolymer is given by 100 $\alpha$mol %. This can be rewritten as $\alpha=xM_M/((10000+x)M_A+xM_M)$.

<Methods for Rating Smoothness>

A guide wire was immersed in a 1 wt % aqueous solution of calcium chloride and was then repeatedly passed through a polyurethane tube having an inner diameter of 1.0 mm and a length of 150 cm, and the smoothness of the guide wire was given five ratings in terms of how it was felt by hands. The ratings are given on a scale of 1 to 5, where 5 is excellent, 4 is good, 3 is moderately bad, 2 is bad, and 1 is very bad.

<Anti-thrombogenicity>

A carotid artery of a male Japanese White rabbit, weighing 2 kg, was connected to a jugular vein with a medical tube. A sample piece was placed within the tube and blood was allowed to flow continuously for 30 minutes. Subsequently, the tube was rinsed with saline five times, filled with 2.5 wt % glutaraldehyde aqueous solution, and left overnight to fix thrombus. The sample piece was then taken out of the tube and was subjected to gold vapor deposition. Using scanning electron microscopy, the surface of the sample piece was observed and the degree of platelet adhesion and the amount of thrombus formation were visually rated. Ratings were given on a scale of 1 to 5, where 5 indicates that no platelet adhesion or thrombus formation was observed, 4 indicates that platelet adhesion was observed to a small extent but no thrombus formation was observed, 3 indicates that significant platelet adhesion was observed while there was no thrombus formation, 2 indicates that platelet adhesion and thrombus formation were both observed, and 1 indicates that platelet adhesion and significant thrombus formation were observed.

<Verification of Structure>

The structure of the copolymer was verified by analyzing $^1$H-NMR and FT/IR spectra. 20 mg of the copolymer powder was dissolved in 1.5 ml of deuterium oxide ($D_2O$) to prepare a sample solution. $^1$H-NMR spectra were obtained for the solution on JNM-EX270, manufactured by JEOL Ltd. A film was prepared by casting a methanol solution containing 5.0 wt % of the sample, and FT/IR spectra thereof were obtained on FT/IR-7300, manufactured by JASCO Corporation.

Example 1-1

Synthesis of MPC/AAM.HCl Polymer 70 g of MPC (237 mmol, 90 mol %), 2.5 g of AAM.HCl (27 mmol, 10 mol %), 0.37 g of 2,2'-azobis (amidinopropane)dihydrochloride (trade name V-50, manufactured by WAKO PURE CHEMICAL INDUSTRIES, Ltd.)(1.4 mmol) as a polymerization initiator were dissolved in 400 ml of water and the air inside the reaction container was completely replaced with gaseous nitrogen. The reaction container was then placed in a heat bath kept at 60° C. for 2 hours to allow the polymerization to proceed. The container was then allowed to cool down and the reaction solution was dialyzed in water for purification. Subsequently, the entire solution was freeze-dried. This resulted in 60.9 g of solid polymer. The yield in proportion to the materials was 84%. Measurements were taken in the manner described above and the number average molecular weight of the polymer was determined to be 134000 while the amount of AAM.HCl was determined to be 0.2 mol %. $^1$H-NMR and IR data of the resulting polymer are as follows.

$^1$H-NMR results; δ (ppm) 1.3; —C—$CH_3$, 2.2; —$CH_2$—, 3.3; —N($CH_3$)$_3$, 3.7; —O—$CH_2CH_2$—N—, 4.0–4.4; —O—$CH_2CH_2$—O—FT/IR results; (cm$^{-1}$); 3400; —OH, 1720; —C=O, 1480; —C—H; 1235; —C—, 1290; —P—O—, 970; —P—O—C—.

Figure 2:
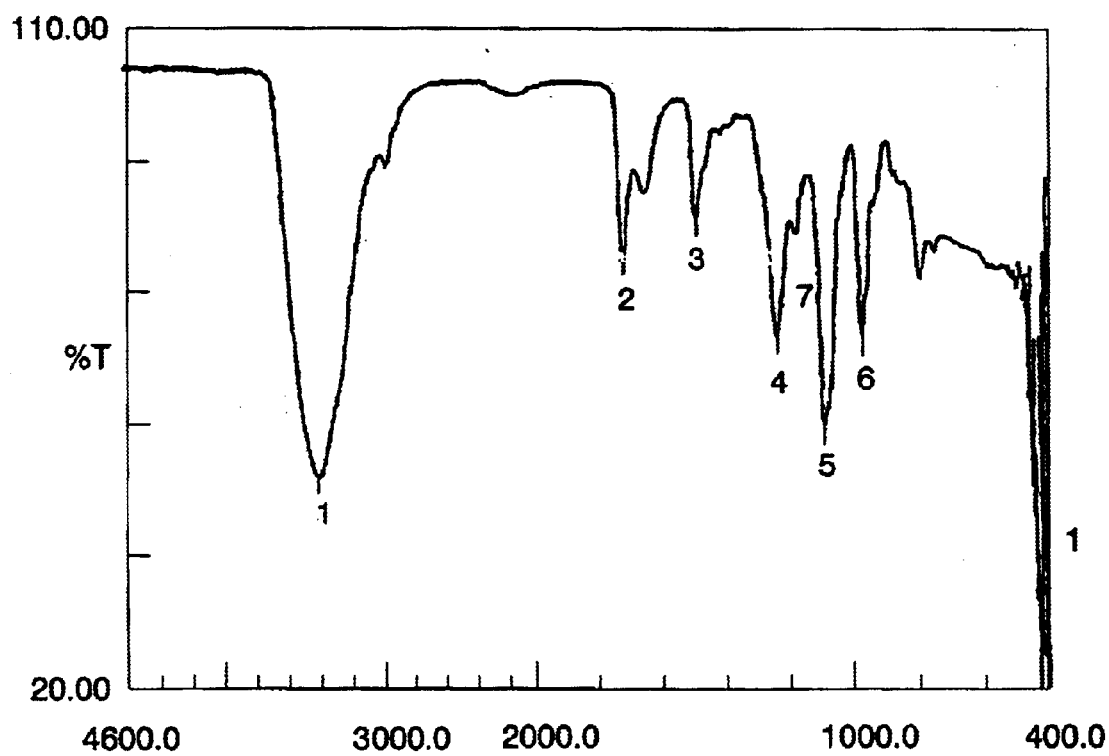
FIG. 2 is a measurement chart of FT/IR of Example 1.

From these results, the resultant polymer was determined to be composed of 0.2 mol % of AAM-HCl and 99.8 mol % of MPC, and have the number average molecular weight of 134000. The $^1$H-NMR and IR measurement charts are shown in FIGS. 1 and 2.

Examples 1-2 and 1-3

Using the same polymerization initiator, solvents, reaction temperatures, reaction time, and total amount of monomer composition (264 mmol) as in Example 1-1, polymerization was carried out in the same manner as in Example 1-1 except that the ratio of MPC to AAM.HCl (in mol %) was 70:30 (Example 1-2) or 50:50 (Example 1-3). The resulting polymers were measured for the number average molecular weight, the amount of AAM.HCl and the yield in the same manner as in Example 1-1. The results are shown in Table 1.

Example 1-4

70 g of MPC, 1.5 g of AAM, 0.37 g of 2,2'-azobis(amidinopropane)dihydrochloride (trade name V-50, manufactured by WAKO PURE CHEMICAL INDUSTRIES, Ltd.)(1.4 mmol) as a polymerization initiator were dissolved in 400 ml of water and the air inside the reaction container was completely replaced with gaseous nitrogen. Since the boiling point of AAM is about 55° C., the reaction solution was placed in a heat bath kept at 40° C. for 6 hours to allow the polymerization to proceed. The solution was then allowed to cool down and was dialyzed in water for purification. Subsequently, the entire solution was freeze-dried to obtain the polymer as a solid product. The number average molecular weight, the amount of AAM.HCl and yield of the polymer were determined in the same manner as in Example 1-1. The results are shown in Table 1.

Examples 1-5 and 1-6

Using the same polymerization initiator, solvents, reaction temperatures, reaction time, and total amount of monomer composition (264 mmol), polymerization was carried out in the same manner as in Example 1-4 except that the ratio of MPC to AAM.HCl (in mol %) was 80:20 (Example 1-5) or 70:30 (Example 1-6). The resulting polymers were measured for the number average molecular weight, the amount of AAM.HCl and the yield in the same manner as in Example 1-1. The results are shown in Table 1.

Example 1-7

Polymerization was carried out in the same manner as in Example 1-2 except that a mixed solvent of 200 ml of ethanol and 200 ml of water was used. The resulting polymer was measured for the number average molecular weight, the amount of AAM.HCl and the yield in the same manner as in Example 1-1. The results are as shown in Table 1.

Comparative Example 1-1

Polymerization was carried out in the same manner as in Example 1-2 except that the reaction temperature was 85° C. The resulting polymer was measured for the number average molecular weight, the amount of AAM.HCl and the yield in the same manner as in Example 1-1. The results are as shown in Table 1.

Comparative Example 1-2

Polymerization was carried out in the same manner as in Example 1-2 except that 400 ml of ethanol was used. The resulting polymer was measured for the number average molecular weight, the amount of AAM.HCl and the yield in the same manner as in Example 1-1. The results are as shown in Table 1.

Comparative Example 1-3

4.4 g of aminoethyl methacrylate hydrochloride (abbreviated hereinbelow as AEM)(27 mmol, 10 mol % of the monomer composition), 70 g of MPC (237 mmol, 90 mol % of the monomer composition), 0.32 g of succinic peroxide (trade name PEROYL SA, manufactured by NOF Corporation)(1.4 mmol) were dissolved in 400 ml of water and the air inside the reaction container was completely replaced with gaseous nitrogen. The reaction solution was then placed in a heat bath kept at 60° C. for 2 hours to allow the polymerization to proceed. After cooling, the reaction solution was dialyzed in water for purification. Subsequently, the entire solution was freeze-dried to obtain the polymer as a solid product. Measurements were taken as in Example 1-1. The results are shown in Table 1.

Comparative Example 1-4

Polymerization was carried out according to the method disclosed in Japanese Patent Publication No. JP-A-7-184989, as described in the following.

6 g of MPC (20 mmol, 35 mol % of the monomer composition), 4.95 g of n-butyl methacrylate (abbreviated hereinafter as BM$_A$) (35 mmol, 60 mol % of the monomer composition), 0.18 g of AAM (3.2 mmol, 5 mol % of the monomer composition), and 0.04 g of AIBN were dissolved in 28 ml of ethanol and the air inside the reaction container was completely replaced with argon gas. The reaction solution was then placed in a heat bath kept at 60° C. for 24 hours to allow the polymerization to proceed. After cooling, the polymerization solution was poured in chloroform according to the method described in the above-quoted publication, resulting in no precipitate formation. Thus, ethyl ether was used in place of chloroform for precipitation. The resulting precipitate was then filtered and dried under vacuum. The polymer so obtained was measured as in Example 1-1. The results are shown in Table 1.

TABLE 1

|  | Examples | | | | | | | Comparative Examples | | | |
| --- | --- | --- | --- | --- | --- | --- | --- | --- | --- | --- | --- |
|  | 1-1 | 1-2 | 1-3 | 1-4 | 1-5 | 1-6 | 1-7 | 1-1 | 1-2 | 1-3 | 1-4 |
| Feeding amount (g) | | | | | | | | | | | |
| AAM·HCl | 2.5 | 7.4 | 12.3 | — | — | — | 7.4 | 7.4 | 7.4 | — | 0.18 |
| AAM | — | — | — | 1.5 | 3.0 | 4.5 | — | — | — | — | — |
| AEM | — | — | — | — | — | — | — | — | — | 4.4 | — |
| MPC | 70 | 54 | 39 | 70 | 62 | 54 | 54 | 54 | 54 | 70 | 6 |
| Amine monomer/MPC (molar ratio) | 10/90 | 30/70 | 50/50 | 10/90 | 20/80 | 30/70 | 30/70 | 30/70 | 30/70 | 10/90 | 5/35 |
| Solvent | | | | | | | | | | | |
| Ethanol (%) | — | — | — | — | — | — | 50 | — | 100 | — | 100 |
| Water (%) | 100 | 100 | 100 | 100 | 100 | 100 | 50 | 100 | — | 100 | — |
| Condition | | | | | | | | | | | |
| Polymerization initiator | V-50 | V-50 | V-50 | V-50 | V-50 | V-50 | V-50 | V-50 | V-50 | V-50 | AIBN |
| Reaction temperature (°C.) | 60 | 60 | 60 | 40 | 40 | 40 | 60 | 85 | 60 | 60 | 60 |
| Reaction time (h) | 2 | 2 | 2 | 6 | 6 | 6 | 2 | 2 | 24 | 2 | 24 |
| Polymer | | | | | | | | | | | |
| Amine monomer/MPC (molar ratio) | 0.2/ 99.8 | 0.7/ 99.3 | 1.9/ 98.1 | 2.6/ 97.4 | 5.4/ 94.6 | 8.5/ 91.5 | 1.2/ 98.8 | 0.7/ 99.3 | 2.5/ 97.5 | 10.2/ 89.8 | 0.001/ 36.8 |
| Number average molecular weight | 134000 | 127000 | 104000 | 324000 | 312000 | 281000 | 67500 | 48200 | 8000 | 153000 | 44300 |
| Yield (%) | 84 | 77 | 55 | 44 | 39 | 34 | 68 | 78 | 12 | 95 | 96 |

V-50: 2,2'-azobis(2-amidinopropane) dihydrochloride (trade name, manufactured by WAKO PURE CHEMICAL INDUSTRIES, Ltd.)
SA: succinic acid peroxide (manufactured by NOF Corporation)

Example 2-1

A guide wire sample piece (0.8 mm in diameter, 15.0 mm in length) coated with polyurethane was immersed in a 1.0 wt % methyl ethyl ketone solution of maleic anhydride/methyl vinyl ether copolymer (trade name GANTREZ, manufactured by International Specialty Products Inc., referred to hereinafter as VEMA-AH) for 10 seconds, and dried at 60° C. for 2 hours, to prepare a sample. 2 g of the polymer prepared in Example 1-2 and 0.2 g of water-soluble carbodiimide condensation agent were added to 100 ml of water to prepare an aqueous solution. The guide wire sample piece was immersed in the solution and left for 2 hours at room temperature to fix the coating. The sample so obtained was rated in terms of its smoothness and anti-thrombogenicity according to the above-described methods. The results are shown in Table 2.

Example 2-2

Coating was fixed in the same manner as in Example 2-1 except that the condensation agent was not used. The sample obtained was rated in terms of the smoothness and anti-thrombogenicity in the same manner as in Example 2-1. The results are shown in Table 2.

Example 2-3

A guide wire sample piece (0.8 mm in diameter, 15.0 mm in length) coated with polyurethane was immersed in a 5 wt % tetrahydrofuran solution of polyisocyanate (trade name CORONATE 1, manufactured by NIPPON POLYURETHANE INDUSTRY Co., Ltd.) for 1 minute, pulled out of the solution, and dried at 50° C. for 2 hours. The resulting guide wire was immersed in a 10 wt % aqueous solution of sodium hydroxide and was left for 30 minutes at room temperature to hydrolyze isocyanate to form amino groups on a surface of the guide wire. The guide wire was then immersed in a 2 wt % methyl ethyl ketone solution of VEMA-AH for 10 minutes, pulled out of the solution, dried for 2 hours at room temperature, and heated for 2 hours at 60° C. The resulting guide wire was immersed in water, left for 3 hours at room temperature, and dried for 24 hours at 60° C. Subsequently, the guide wire was immersed in an ethanol solution containing 2 wt % of the polymer prepared in Example 1-2 for one minute, pulled out of the solution, dried for 2 hours at room temperature, and heated for 3 hours at 90° C. to fix the coating. In the same manner as in Example 2-1, the sample so obtained was rated in terms of its smoothness and anti-thrombogenicity. The results are shown in Table 2.

Example 2-4

A guide wire sample piece (0.8 mm in diameter, 15.0 mm in length) coated with polyurethane was immersed in a 2 wt % methyl ethyl ketone solution of half-esterified VEMA-AH (referred to hereinafter as VEMA-HE) for 10 seconds, pulled out of the solution, dried for 2 hours at room temperature, and heated for 3 hours at 120° C. The resulting guide wire was immersed in water, left for 3 hours at room temperature, and dried for 24 hours at 60° C. Subsequently, the guide wire was immersed in a 2 wt % ethanol solution of the polymer prepared in Example 1-2 for one minute, pulled out of the solution, dried for 2 hours at room temperature, and heated for 3 hours at 90° C. to fix the coating. In the same manner as in Example 2-1, the sample so obtained was rated in terms of its smoothness and anti-thrombogenicity. The results are shown in Table 2.

Example 2-5

Coating was fixed in the same manner as in Example 2-4 except that a stainless guide wire sample piece (0.65 mm in diameter, 15.0 mm in length) was used in place of the polyurethane-coated guide wire sample piece (0.8 mm in diameter, 15.0 mm in length). The resulting sample was rated in terms of its smoothness and anti-thrombogenecity. The results are shown in Table 2.

Comparative Example 2-1

Coating was fixed and the sample was rated in terms of its smoothness and anti-thrombogenicity in the same manner as in Example 2-1, except that the polymer obtained in Comparative Example 1-1 was used. The results are shown in Table 2.

Comparative Example 2-2

Coating was fixed and the sample was rated in terms of its smoothness and anti-thrombogenicity in the same manner as in Example 2-1, except that the polymer obtained in Comparative Example 1-3 was used. The results are shown in Table 2.

Comparative Example 2-3

Coating was fixed and the sample was rated in terms of its smoothness and anti-thrombogenicity in the same manner as in Example 2-1, except that the polymer obtained in Comparative Example 1-4 was used. The results are shown in Table 2.

Comparative Example 2-4

A guide wire sample piece (0.8 mm in diameter, 15.0 mm in length) coated with polyurethane was immersed in 10 wt % methyl ethyl ketone solution of VEMA-AH for 10 seconds, pulled out of the solution, and dried for 2 hours at 60° C. The resulting guide wire was immersed in 0.1N aqueous solution of sodium hydroxide, left for 3 hours at room temperature, rinsed with pure water, and dried for 24 hours at 40° C., to prepare a sample. In the same manner as in Example 2-1, the sample so obtained was rated in terms of its smoothness and anti-thrombogenicity. The results are shown in Table 2.

Comparative Example 2-5

A guide wire sample piece (0.8 mm in diameter, 15.0 mm in length) was coated with polyurethane and was rated in terms of its smoothness and anti-thrombogenicity in the same manner as described above. The results are shown in Table 2.

As is known from Table 2, the guide wires of Examples 2-1 to 2-5, each of which was coated with the polymer having the number average molecular weight of 127000, showed better smoothness and anti-thrombogenicity than did the guide wire of Comparative Example 2-1, which was coated with the polymer having the number average molecular weight of 48200. The guide wires of Examples 2-1 to 2-5 also showed better smoothness and anti-thrombogenicity than did the guide wire of Comparative Example 2-2, which was coated with the polymer containing significant amount of amino groups. Also, the guide wire obtained in Comparative Example 2-3 has smoothness and anti-thrombogenicity that are comparable to those of the guide wire of Comparative Example 2-4, which was subjected to pre-treatment only. The reason for this seems to be that the polymer used in Comparative Example 2-3 contained amino groups in such a small amount that binding of the polymer to the guide wire did not take place.

TABLE 2

|  |  | Examples | | | | | Comparative Examples | | | | |
| --- | --- | --- | --- | --- | --- | --- | --- | --- | --- | --- | --- |
|  |  | 2-1 | 2-2 | 2-3 | 2-4 | 2-5 | 2-1 | 2-2 | 2-3 | 2-4 | 2-5 |
| Reagents |  |  |  |  |  |  |  |  |  |  |  |
| Sample polymer | | Ex. 1-2 | Ex. 1-2 | Ex. 1-2 | Ex. 1-2 | Ex. 1-2 | Comp. Ex. 1-1 | Comp. Ex. 1-3 | Comp. Ex. 1-4 | — | — |
| Number average molecular weight | | 127000 | 127000 | 127000 | 127000 | 127000 | 48200 | 153000 | 44300 | — | — |
| Ratio | MPC | 99.3 | 99.3 | 99.3 | 99.3 | 99.3 | 99.3 | 89.8 | 36.8 | — | — |
|  | AAM | 0.7 | 0.7 | 0.7 | 0.7 | 0.7 | 0.7 | 0.7 | 0.7 | — | — |
|  | AEM | — | — | — | — | — | — | 10.2 | — | — | — |
|  | BMA | — | — | — | — | — | — | — | 63.2 | — | — |
| Sample pieces |  |  |  |  |  |  |  |  |  |  |  |
| Substrate | | Polyurethane | Polyurethane | Polyurethane | Polyurethane | Stainless steel | Polyurethane | Polyurethane | Polyurethane | Polyurethane | Polyurethane |
| Pre-treatment material | | VEMA-AH | VEMA-AH | VEMA-AH | VEMA-HE | VEMA-HE | VEMA-AH | VEMA-AH | VEMA-AH | VEMA-AH | — |
| Condensation agent used/not used | | used | not used | not used | not used | not used | used | used | used | — | — |
| Results |  |  |  |  |  |  |  |  |  |  |  |
| Smoothness | Passed | 5 | 5 | 5 | 5 | 5 | 5 | 2 | 5 | 5 | 1 |

TABLE 2-continued

| | | Examples | | | | | Comparative Examples | | | |
|---|---|---|---|---|---|---|---|---|---|---|
| | | 2-1 | 2-2 | 2-3 | 2-4 | 2-5 | 2-1 | 2-2 | 2-3 | 2-4 | 2-5 |
| ness evaluation points | once Passed 200 times | 5 | 4 | 5 | 5 | 5 | 3 | 1 | 1 | 1 | 1 |
| Antithrombogenicity evaluation points | | 5 | 5 | 5 | 5 | 5 | 4 | 3 | 2 | 2 | 1 |

What is claimed is:

1. A random copolymer comprising:

a constituent unit (a1) derived from allylamine or a salt thereof and represented by formula (1):

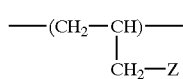
(1)

wherein Z is —$NH_2$ or a salt thereof; and a constituent unit (a2) derived from a monomer having a phosphorylcholine-like group and represented by formula (2):

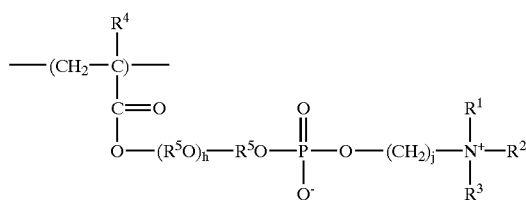
(2)

wherein $R^1$, $R^2$ and $R^3$ are the same or different and each represents a hydrocarbon group having 1 to 4 carbon atoms, $R^4$ represents a hydrogen atom or a methyl group, $R^5$ represents a divalent hydrocarbon group having 12 to 120 carbon atoms, h is an integer from 0 to 10, and j is an integer from 2 to 4;

wherein the copolymer contains the constituent unit (a1) derived from allylamine or a salt thereof in an amount of 0.01 to 9 mol % and the constituent unit (a2) derived from the monomer having the phosphorylcholine-like group in an amount of 91 to 99.99 mol %, and wherein the copolymer has a number average molecular weight of 50000 to 5000000.

2. The random copolymer according to claim 1, containing another constituent unit other than the constituent unit (a1) and the constituent unit (a2) in an amount of 8.99 mol % or less.

3. A method for producing the random copolymer of claim 1 characterized by allowing a monomer composition containing allylamine or a salt thereof and a monomer having a phosphorylcholine-like group to undergo radical polymerization at a temperature of 5 to 80° C. in an aqueous solvent containing 50 wt % or more of water, using at least one polymerization initiator selected from an azo-polymerization initiator and a radical polymerization organic peroxide.

4. The method according to claim 3, wherein the aqueous solvent is selected from the group consisting of water and water-alcohol solvents.

5. The method according to claim 3, wherein the polymerization initiator is water-soluble azo-compound.

6. A medical material comprising the random copolymer of claim 1.

7. A medical material obtained by fixing the random copolymer of claim 1 to a surface of a medical instrument.

8. A medical material obtained by mixing the random copolymer of claim 1 with a material of a medical instrument and shaping the mixture into the medical instrument.

* * * * *